Oct. 2, 1928.
G. FAUSER
1,686,371
APPARATUS FOR THE PRODUCTION OF SYNTHETIC AMMONIA
Filed Aug. 21, 1925
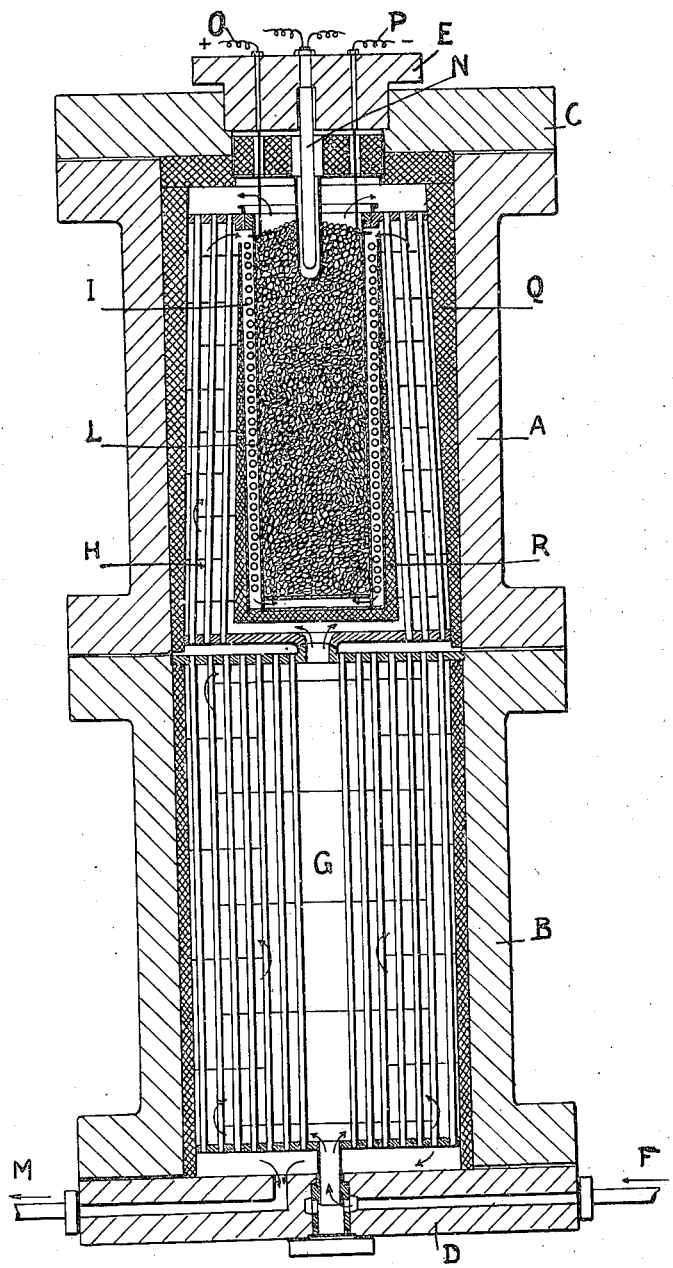
Inventor
Giacomo Fauser
By [signature]
his Attorney.

Patented Oct. 2, 1928.

1,686,371

UNITED STATES PATENT OFFICE.

GIACOMO FAUSER, OF NOVARA, ITALY.

APPARATUS FOR THE PRODUCTION OF SYNTHETIC AMMONIA.

Application filed August 21, 1925, Serial No. 51,705, and in Italy September 24, 1924.

The apparatus comprises two steel cylinders A and B connected to one another by means of flanges and closed at their ends by the covers C and D.

The gas mixture N+3H intended to be converted into synthetic ammonia is delivered under pressure by the piping F and enters the lower tube bank G in which it travels outside of the tubes and is heated by the gases that have already been catalyzed; from the lower tube bank G the preheated gas mixture passes up into the upper tube bank H. This tube bank H has the form of a truncated cone, the smaller base of the cone lying upward, so that the refractory lining Q constituting the thermal insulation of the outer wall intended to withstand the pressure gradually increases in thickness according as the gas temperature rises. In this manner the temperature of the outer cylinder which has got to withstand the pressure is maintained uniform throughout the cylinder length.

After reaching the top of the tube bank H the gas mixture flows through the annular space I and comes into contact with the thermoelectric coil L, the object of which is to perform its action at the starting of the work in order to raise the N+3H mixture to the temperature required by the reaction. Later, the temperature is maintained by the heat developed by the reaction itself.

The annular space I is surrounded by a refractory layer R of truncated-conical form, so that this heat-insulating layer increases in thickness according as the temperature difference between the thermoelectric coil and the surrounding gases becomes greater.

The advantages of this arrangement are obvious:

The radiated heat from the reaction chamber is not transmitted direct to the outer tube, but is transferred to the surrounding gases, so that the temperature of the said tube remains far below the temperature degree at which pressure hydrogen impairs the steel.

The arrangement of the thermo-electric coil at the end of the reaction chamber is more desirable than arranging it along the center axis for the following reasons:

(1) The thermo-electric coil is intended to heat the gases only at the starting; accordingly, as its contact surface with the gas mixture is large, it will cause the reaction temperature to be reached more rapidly and, the electric energy applied being equal, its temperature excess over the surrounding gases will be less, the danger of the coil turns being noted being thus reduced.

(2) On the self-reaction being attained, the thermo-electric coil ceases to be superheater by the electric current. At this point the advantage of the novel arrangement permitting the best utilization of the heat radiated by the catalyzation chamber is far greater, because the said radiated heat acts, without undergoing any dispersion, on the fresh gas that circulates outside of the catalyzation chamber before entering it. If the thermo-electric coil were arranged in the center of the catalyzation chamber, the latter should necessarily be designed with a larger diameter; the heat dispersion would accordingly be a larger one and the outer tube which has to withstand the pressure would be subjected to a higher temperature and thus be liable to deterioration by the deleterious action of hydrogen.

After traversing the catalyzer placed in the chamber L, the gas mixture N+3H travels downwards again through the tubes of the tube banks; on this downward travel the mixture flows inside of the tubes, gives off its heat to the fresh gases and finally issues from the apparatus at the bottom through pipe M.

A thermo-electric couple N serves to indicate the temperature of the reaction chamber.

The replacement of the catalyzer can be readily effected by removing the cover E and extracting the chamber surrounded by the electric coil L.

Having now particularly described and ascertained the nature of my said invention and in what manner the same is to be performed, I declare that what I claim is:—

1. An apparatus wherein chemical reactions at high temperature and pressure are conducted, comprising a reaction chamber, an enclosing wall spaced from said chamber and adapted to withstand internal pressure, a heat exchanger in the space between the reaction chamber and said enclosing wall, said exchanger comprising tube sheets and a plurality of tubes extending longitudinally of said reaction chamber, and a body of heat-insulating material surrounding said reaction chamber, the thickness of said body varying directly with the temperature gradient in said heat exchanger.

2. An apparatus for the production of synthetic ammonia comprising a reaction chamber, a casing spaced from and surrounding said chamber, a plurality of longitudinally extending tubes comprising a heat recuperating tube bank having the shape of a truncated cone surrounding said chamber, and a truncated-cone-shaped body of heat insulating material between said tube bank and said casing, the thickness of said body varying directly with the temperature gradient in said tube bank.

3. Apparatus for the production of synthetic ammonia comprising a casing, a reaction chamber centrally disposed in said casing, a bank of tubes surrounding said casing, the tubes comprising said bank having their longitudinal axes slightly inclined with respect to said reaction chamber and forming a frustro-conical system having its larger base at the bottom of the reaction chamber, said bank of tubes being separated from said casing by a body of heat insulating material decreasing in thickness from top to bottom, and said reaction chamber being separated from said bank of tubes by a body of heat insulating material increasing in thickness from top to bottom.

4. Apparatus for the production of synthetic ammonia comprising a casing, a reaction chamber centrally disposed in said casing, a thermo-electric coil surrounding the exterior of said reaction chamber, and a bank of inclined tubes forming a truncated conical system disposed in the space between said reaction chamber and said casing.

GIACOMO FAUSER.